UNITED STATES PATENT OFFICE.

NATHANIEL P. PRATT, OF DECATUR, GEORGIA, ASSIGNOR TO PRATT PROCESS COMPANY, OF DECATUR, GEORGIA, A CORPORATION OF GEORGIA.

TREATMENT OF PHOSPHATES.

1,014,255. Specification of Letters Patent. Patented Jan. 9, 1912.

No Drawing. Application filed July 5, 1911. Serial No. 637,025.

*To all whom it may concern:*

Be it known that I, NATHANIEL P. PRATT, a citizen of the United States, residing at Decatur, in the county of Dekalb and State of Georgia, have invented certain new and useful Improvements in the Treatment of Phosphates, of which the following is a specification.

My invention relates to the treatment of phosphates.

In the broadest aspect of the invention, it resides in a method of treating phosphates containing sulfates which consists in separating the sulfates from the phosphates.

In a more specific aspect, the invention resides in a process of enriching a phosphatic mass, containing calcium sulfate which is soluble in certain media and calcium phosphate which is insoluble in those media, which consists in subjecting said mass to the action of a suitable solvent to dissolve the sulfate, and then separating said sulfate-charged solution from the phosphate.

As is well known, in the manufacture of commercial acid phosphate, a mass containing a certain percentage of bone phosphate of lime, after fine grinding, is submitted to a given quantity and strength of sulfuric acid. The result of this admixture is substantially to reduce the insoluble phosphate of lime to mono-calcic phosphate and free phosphoric acid. There, also, usually results a small percentage of di-calcic phosphate; but there remains no insoluble bone phosphate of lime in said mass if the reaction in the mixture should be ideally complete.

It is well known that free phosphoric acid, and, also, the mono-calcic salt of the acid phosphate of commerce, quickly revert to the citrate-soluble, or di-calcic form, when applied to the soil, and that, practically speaking, their agricultural value to the growing plant is not decreased after such reversion takes place.

In a commercial acid phosphate, such as described above, if the free phosphoric acid and the mono-calcic salt are reverted to the di-calcic form—which can easily be done in any one of several ways, for instance, by the addition of a certain equivalent of finely-ground calcium carbonate—the agricultural value of the acid phosphate is not materially decreased, though the contained di-calcic salt becomes insoluble in certain media. My invention applies to the treatment of commercial acid phosphate, which usually carries in the neighborhood of sixty per cent. (60%) of calcium sulfate. It also applies to tri-calcium phosphate and native phosphates which have been treated with the necessary amount of sulfuric acid, and in the manner required, for the direct formation of the di-calcic salt and other phosphates insoluble in water but soluble in ammonium citrate solution. In the application thereto of certain solutions,—sea water, for instance—the di-calcic phosphate remains undissolved, and the calcium sulfate is dissolved, and may be eliminated in any suitable manner, the result of the elimination being to increase the percentage of di-calcic phosphate in an ordinary acid phosphate to an extent at least double.

Whenever a phosphatic mass, of any kind, is found to embody, as one of its ingredients, a sulfate, such as calcium sulfate, my invention may be most advantageously utilized to separate the sulfate from the phosphate. It is a feature of my invention, therefore, to separate the sulfate from the phosphate, and this may be accomplished by subjecting a phosphatic mass containing sulfates and insoluble phosphates to the action of a sulfate-dissolving solution, and then eliminating from the phosphates the resulting solution.

My invention is equally applicable to certain native phosphates with which I have become familiar and which differ substantially from other known native phosphates in at least two respects: first, they are not in the usual form of rock; and, secondly, they include, as shown by analysis, about thirty-four per cent. (34%) of calcium sulfate, approximately, and about sixty per cent. (60%), approximately, of bone phosphate of lime, the last-mentioned being practically insoluble in water. The valuable constituent desired for the manufacture of commercial acid phosphate or fertilizers from such native material is bone phosphate of lime. By reason of the fact that these particular phosphates include practically no impurities, such as clay, sand, etc., in the sense that such impurities usually exist in other native phosphates and which have to be taken into consideration in other processes, I am enabled to utilize my process on them with great success. Thereby, I not only am able materially to reduce the cost of production, but the product obtained is exceedingly rich in its inclusion of a desired proportionate amount of calcium phosphate. This particular subject-matter is more specifically described in my pending application, filed January 27th, 1911, Serial No. 604,998.

As is generally known to those familiar with the art, native phosphates have heretofore been prepared for use by washing with water. By a system of flushing, this water removes the sand and clay. The product resulting from the application of my invention to native phosphates containing sulfates is distinguished from these so-called "washed phosphates," as will readily be understood by those skilled in the art. I have found, by experiments, that the methods heretofore practiced will not suffice to produce the best results in connection with said native phosphates: In the first place, the material is loose, light and earthy, and there are, as already stated, none of the usual impurities, such as sand, clay, etc., present; and, in the second place, the main, and practically the only, ingredient therein other than calcium phosphate, is calcium sulfate. It is desirable to remove this from the phosphate because it is not a valuable fertilizer-ingredient. It cannot, however, be separated therefrom at all by suspension in water like sand and clay, but, by experience, I have discovered that it is soluble in fresh water. It is more readily soluble in saline solutions, and, particularly, in that class of solutions comprising, or which includes, sea water. I have also discovered that these water and similar solvents have little or no practical action on the calcium phosphate present in the mass.

For the treatment, of either the manufactured acid phosphate of commerce, or of other phosphates containing sulfates, or of native phosphates similar to those above described, I subject said phosphates to the action of a suitable solvent, such as water, or a saline solution like sea water, or any of the known solvents, either by treating the material with the solvent and settling it out, and then eliminating the water to thereby carry off the sulfates in solution; or by percolation through the mass; or, in fact, by any other suitable means of treatment; the object being, always, to dissolve the sulfates out of the mass and leave the phosphates present. The action of the solvent, be it fresh water, or a saline solution like sea water, or any other appropriate solvent, is to dissolve the sulfates out of the phosphatic mass. I have found, by this novel method of solution and elimination, that the sulfates can be removed, and with the practical result that, a mass of acid phosphate which, for instance, contains eighteen per cent. (18%) of di-caclic phosphate is brought up to a richness of forty per cent. (40%) or more of di-calcic phosphate; and a mass of native phosphate which contains, say, sixty per cent. (60%) of bone phosphate of lime, and, say, thirty per cent. (30%) of calcium sulfate, is raised to a richness of approximately ninety per cent. (90%) of bone phosphate of lime. By my invention, I am therefore enabled to utilize, with new results, solvents, such as water, saline solutions—of which sea water furnishes a preferable type—and other solvents, to enrich phosphates insoluble in said media but containing sulfates soluble therein; and this process I claim broadly.

While I have herein described my new method in detail, it is to be understood that I do not limit myself to such details of procedure, except in so far as these may be specified in the claims.

Having thus fully described my invention, the procedure followed thereunder, and the results produced, what I claim as new and desire to secure by Letters-Patent of the United States is:

1. The method of treating mixtures of phosphates and sulfates, which consists in separating the sulfates from the phosphates by dissolving out the sulfates and leaving the phosphates intact, or substantially so.

2. The method of treating phosphates containing sulfates, which consists in separating the sulfates from the phosphates, such separation being effected by subjecting the same to the solvent action of sea water and subsequently eliminating from the mass the water containing the sulfate.

3. The method of treating mixtures of phosphates insoluble in water, and sulfates soluble therein, which consists in subjecting the same to the solvent action of water to separate the sulfates from the phosphates, and then eliminating the water containing the sulfates.

4. The method of treating mixtures of insoluble phosphates and calcium sulfate, which consists in subjecting the same to the solvent action of a medium characterized by a sulfate-dissolving action, and eliminating from the phosphates the solution produced.

5. The method of treating phosphates containing sulfates which consists in subjecting the same to the solvent action of a saline solution to separate the sulfates from the phosphates, and then eliminating the sulfate-impregnated solution.

6. The method of treating phosphates containing sulfates which consists in subjecting the same to the solvent action of a saline solution including sea water to separate the sulfates from the phosphates, and then draining off the sulfate-impregnated water.

7. The method of treating phosphates containing sulfates, which consists in subjecting the same to the solvent action of sea water and subsequently eliminating from the mass the water containing the sulfates.

8. The herein-described process of enriching a phosphatic mass containing calcium sulfate soluble in water and calcium phosphate insoluble in water, which consists in subjecting said mass to the action of water to dissolve the sulfate, and then separating said sulfate-charged water from the phosphates.

9. The herein-described process of enriching a phosphatic mass to approximately 90% bone phosphate of lime, which consists in subjecting native phosphates containing sulfates to the action of sea water and then separating the sulfate-containing water from the mass.

10. The herein-described process of treating native phosphates which consists in removing the calcium sulfate from the calcium phosphate by means of sea water, and then separating the sulfate solution from the phosphates which are insoluble in said water.

11. The method of treating a phosphatic mass containing, as one component, calcium sulfate and, as another component, phosphoric acid in any form more acid than the di-basic salt, which consists in reverting said second-mentioned component to the di-calcic form, and then separating the sulfate from the phosphate.

12. The method of treating a phosphatic mass containing as one component, calcium sulfate, and, as another component, phosphoric acid in any form more acid than the di-basic salt, which consists in reverting said second-mentioned component to the di-calcic form; then subjecting the mass to the solvent action of a medium characterized by a sulfate-dissolving action; and, then, eliminating from the phosphates the resulting solution.

13. The method of treating a phosphatic mass containing, as one component, sulfates, and, as another component, phosphoric acid in any form more acid than the di-basic salt, which consists in reverting said second-mentioned component to the di-calcic form; then subjecting the mass to the solvent action of a saline solution to separate the sulfates from the phosphates, and then eliminating the sulfate-impregnated liquid.

In testimony whereof I affix my signature in presence of two witnesses.

NATHANIEL P. PRATT.

Witnesses:
ARTHUR J. WAND,
EDMUND H. PARRY.

---

Copies of this patent may be obtained for five cents each, by addressing the "Commissioner of Patents, Washington, D. C."